Patented May 24, 1932

1,859,581

UNITED STATES PATENT OFFICE

JOHN H. CALBECK, OF JOPLIN, MISSOURI

METHOD OF MAKING STORAGE BATTERY PLATES

No Drawing.   Application filed April 28, 1927.  Serial No. 187,409.

My invention relates to materials for electrodes of storage batteries, and its object is to lower the cost of production of lead cells, to simplify preparation, to shorten the period of production, and to eliminate some of the steps now necessary in the manufacture of formed plates.

This object is accomplished by the use of lead sulphide, and the employment of a method of treating lead sulphide ore, which will be particularly described.

Heretofore metallic lead has been the commercial product from which the materials for battery plates of the lead type have been obtained. The metallic lead is pig lead produced by the smelting and refining of lead ore, the ore usually being the natural lead sulphide, which is also well known as galena. The pig lead is converted into two chief materials for the making of filled plates, both being lead oxides, namely, red lead, $Pb_3O_4$, and litharge PbO. The oxides are sold to the battery makers, who incorporate the material into the electrode in dry or paste form. It is to be understood in the following pages that a dry filler is included under the term "paste", when a filling material referred to may be applied to an electrode plate in dry form. When employing the paste form, the pastes are mixed according to individual formulæ, as by using sulphuric acid as a liquid and mixing agent, adding small amounts of metallic lead and lead sulphate, and also, in some cases, using selected extenders containing no lead. The mixture is then pasted on grids which are positioned in an electrolyte, and the plates formed into positive and negative electrodes by means of electrical currents, whereby active material is produced in and on the paste of the plates.

I purpose to eliminate smelting and oxidizing steps with their heavy expense and incidental losses of lead; and to substitute a process of treating the ore substantially less costly than smelting, and to provide a filler-making material having qualities rendering it superior to the oxides.

My invention consists primarily in the use of lead sulphide as the basic material for the making of active material for storage battery electrodes. I propose to treat lead ore, the natural lead sulphide or galena, to remove impurities; to grind the purified sulphide, and to prepare it further for the use of battery manufacturers.

The first step in the process consists in the selection of lead ore as delivered by the mine relatively free from other metals, particularly silver, zinc and iron, for example the disulphides of iron, pyrite and marchasite. Since the presence of silver in the ore would be especially troublesome, I prefer galena from lead mines producing ore lacking that metal. Selection would, under some circumstances, yield a relatively pure ore. I then produce concentrates, giving special attention to the operation of jigs and tables in the washing and concentrating of the ore, whereby I provide a natural lead sulphide needing only drying and pulverizing to produce the paste material, though small amounts of impurities would be present. I prefer, in the use of merely this first step in my method, to grind the selected ore wet and so retain the most precise control of the results of grinding to obtain desired particle size and particularly to obtain uniformity of particle size whereby the highest bulking properties would be secured.

Another major step in my process comprises the removal of impurities carried by the natural lead sulphide as it comes from the concentrator. This step is taken before, during or after grinding, and may include roasting or other process to prepare constituents for solution, and includes dissolving out of impurities by acid or other solvents, for example, by dilute sulphuric acid, another acid, or a solution of salts. A dilute sulphuric acid of strength necessary to attack the iron compounds for extraction from the galena, could be employed at a temperature at which it would not appreciably decompose the lead sulphide.

A third step in the process, to provide paste materials of particular character for specific purposes, consists in the production of a desired proportion of a supplemental substance disseminated through a body of paste material. I may treat portions of finely ground sulphide electrically to produce in a given quantity of the sulphide material a percentage of sponge lead or other reduction product. I may dry a given quantity of sulphide material, or a given quantity of electrically treated sulphide material, in such a manner that some of the sulphide will be permitted to be oxidized to desired products such as lead sulphate. My process contemplates that the oxidation products and the reduction products of the lead sulphide may be produced and used with it.

A particular advantage of a lead sulphide paste material produced by my process, consists in the lower specific gravity of the material that I provide, compared with the oxides usually supplied. Since lead sulphide has a specific gravity of 7.48, against the specific gravity of approximately 9.00 of the oxides of lead, the sulphide bulks higher than the oxides, a characteristic especially desirable in paste material.

The improved and less expensive filling material having been provided as above described, it may be introduced into a mixture with litharge or red lead, or both, to reduce the cost of the resulting filling material, the supports supplied with the mixture, and the electrodes formed in the usual manner. The lead sulphide material may be substituted for lead oxides in a conventional formula, for example, negative plates may be provided with a mixture constructed with the use of lead sulphide material, lamp black, 1.100 sulphuric acid; and the positive plates with a mixture from 75 parts lead sulphide material, 25 parts red lead, and 1.100 acid. I prefer to provide one paste for both electrode groups; and make a paste with lead sulphide material and sulphuric acid alone or with lead sulphide, lead oxide and sulphuric acid. I differentiate the positives and negatives in the process of formation, or form all plates as negatives and re-form a part of them as positives.

The process of formation of active material from a paste containing my lead sulphide produces a greater degree of porosity than is the case with formation of plates from red lead or litharge paste. For example, the evolution of hydrogen sulphide occurs with the reduction of lead sulphide to sponge lead, the gas being given off continuously and tending to keep the plate porous.

The characteristic of this lead sulphide as being a substantially better conductor of electricity than red lead or litharge, and very much better than lead sulphate, assists materially in the formation of the plates, and may enable me to dispense with conducting substances such as lamp black in the formula.

A further advantage of the use of the described lead sulphide paste is the lower requirement of electrical energy for the reduction of the pasted plate to sponge lead than in the case of a lead sulphate plate, suggesting not only less cost for current, but shorter time for formation and proportionately increased production, important features in view of the fact that positives formed against negatives of usual composition may be completed before the negatives and must be removed to prevent over-formation. It is understood that in the positive plate lead sulphide is being oxidized to lead peroxide in a manner somewhat similar to the oxidation of lead sulphate to lead peroxide.

It is to be understood that the order in which steps recorded are to be taken may be varied, and that one step of the process may be used independently of the others, when materials are provided that do not require the additional steps. For example, the steps concerning the treatment of lead ore, or the treatment of galena, may be dispensed with when lead sulphide is otherwise provided, the processes for conditioning a body of the sulphide by partially oxidizing or reducing the body for application to the support, or the formation processes, being then adequate to fulfill the primary object of my invention, namely, use of lead sulphide in the manufacture of storage battery electrodes.

What I claim and desire to secure by Letters Patent is:

1. The process of treating lead sulphide ores for preparing a filler for storage battery plates, comprising concentrating the lead sulphide ores, and treating a body of the concentrated lead sulphide to produce predetermined limited proportions of the oxidation products of lead sulphide in the body of concentrated lead sulphide.

2. The process of conditioning a body of lead ore for use as a battery plate filler, including grinding the body to provide a relatively large proportion of its constitutent particles having substantially the same size, treating the ground body to oxidize only a relatively small proportion of the constituent particles, and mixing the resulting complex body with a pasting solution for application to a grid to comprise a plate ready for forming.

3. The process of conditioning a body comprising lead sulphide for mixture with a pasting solution to constitute a plate filler, consisting of grinding the lead sulphide, then treating the ground lead sulphide electrically to change a limited portion of the lead sulphide into a reduction product, and then mixing the electrically treated body with a pasting solution.

4. The process of preparing a filler for storage battery plates including grinding a body of lead sulphide, subjecting said body to electrical treatment to produce a reduction product of said body, and controlling said treatment to limit the proportion of said reduction product to the unreduced lead sulphide in said body.

5. The process of preparing a filler for storage battery plates including grinding a body of lead sulphide, subjecting said body to electrical treatment to produce a derivative product of said body, and controlling said treatment to limit the proportion of said derivative product to the unaffected lead sulphide in said body.

6. A process of the character described, including partially oxidizing a body of powdered lead sulphide to produce in said body a relatively small proportion of lead sulphate.

In testimony whereof I affix my signature.

JOHN H. CALBECK.